(12) United States Patent
Holiday

(10) Patent No.: US 6,778,544 B1
(45) Date of Patent: Aug. 17, 2004

(54) METHOD AND SYSTEM FOR REDIRECTING CALLS

(75) Inventor: Matthew R. Holiday, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/193,890

(22) Filed: Nov. 18, 1998

(51) Int. Cl.$^7$ ............................................. H04M 3/42
(52) U.S. Cl. ..................... 370/410; 370/467; 370/522; 379/229; 379/230
(58) Field of Search ................. 370/389, 392, 370/465, 466, 467, 469, 473, 474, 475, 522, 524, 410, 401; 379/229, 230, 211.01, 211.02

(56) References Cited

U.S. PATENT DOCUMENTS

| | | | | |
|---|---|---|---|---|
| 5,742,668 A | * | 4/1998 | Pepe et al. ..................... | 379/58 |
| 6,069,890 A | * | 5/2000 | White et al. ................. | 370/352 |
| 6,097,801 A | * | 8/2000 | Williams et al. ............ | 379/207 |
| 6,122,258 A | * | 9/2000 | Brown ........................ | 370/256 |
| 6,161,008 A | * | 12/2000 | Lee et al. ................... | 455/414 |
| 6,243,376 B1 | * | 6/2001 | Ng et al. ..................... | 370/352 |
| 6,256,389 B1 | * | 7/2001 | Dalrymple .................. | 379/900 |
| 6,259,691 B1 | * | 7/2001 | Naudus ....................... | 370/352 |
| 6,373,835 B1 | * | 4/2002 | Ng et al. ..................... | 370/352 |
| 6,381,329 B1 | * | 4/2002 | Uppaluru et al. ....... | 379/266.04 |
| 6,466,570 B1 | * | 10/2002 | Low et al. .................. | 370/352 |
| 6,480,484 B2 | * | 11/2002 | Morton ....................... | 370/352 |

OTHER PUBLICATIONS

Howes, Timothy A., Ph.D and Mark C. Smith. *LDAP: Programming Directory–Enabled Applications with Lightweight Directory Access Protocol*, MacMillan Technical Publishing, Indianapolis, IN, 1997.
Russell, Travis. *Signaling System #7, 2$^{nd}$*, McGraw Hill, New York, NY, 1998.

* cited by examiner

*Primary Examiner*—Chau Nguyen
*Assistant Examiner*—Duc Duong
(74) *Attorney, Agent, or Firm*—Carr LLP

(57) ABSTRACT

A method is disclosed for redirecting calls more efficiently, whereby an LDAP query is encoded with a called telephone number. The LDAP query is transmitted from a TCP/IP to an LDAP server via an IP network, and the TCP/IP awaits a response back from the LDAP server, which response identifies a corrected destination address, and may include translated digits which may be used in telephony routing.

17 Claims, 3 Drawing Sheets

US 6,778,544 B1

METHOD AND SYSTEM FOR REDIRECTING CALLS

TECHNICAL FIELD

The present invention relates in general to call redirection and, in particular, to a method and system for using a lightweight directory access protocol (LDAP) to redirect calls.

BACKGROUND OF THE INVENTION

Conventionally, calls placed in the Public Switched Telephone Network (PSTN) require offboard lookups to redirect the call to the correct destination. For example, when a caller makes an 800 or 888 long-distance call, wherein a service access code (SAC) is translated into a directory number, or when a caller makes a local number portability (LNP) call, wherein a local routing number is used alongside the original directory number to route the call to its destination, a Signaling System 7 (SS7) Transaction Capabilities Application Part (TCAP) stack performs the necessary query from the switch to an offboard signaling transfer point (STP) and Signaling Control Point (SCP). Such SAC or LNP queries may also be performed using proprietary data protocols such as an X.25 network, or the like.

A drawback with using the SS7/TCAP stack, together with the STP and SCP, to perform SAC and/or LNP queries is that 30–40% more time is consumed routing redirected calls than is consumed routing non-redirected calls. This causes more blockage of telephone lines, and reduces the traffic capacity of telephone switches. SS7/TCAP stack systems are also relatively expensive. Accordingly, a continuing search has been directed to the development of methods and systems which can be used to perform SAC and/or LNP queries and to redirect calls more quickly and cost-effectively than is possible using a SS7/TCAP stack, SCP, and STP combination.

SUMMARY OF THE INVENTION

According to the present invention, SAC and/or LNP queries and the redirecting of calls is improved by using a TCP/IP stack and LDAP protocol in lieu of an SS7/TCAP stack, SCP, and STP. This permits the use of internet protocols which are less expensive and faster than an SS7/TCAP stack, SCP, and STP, thereby reducing telephone line blockage and increasing the traffic capacity of telephone switches.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF A PREFERRED EMBODIMENT

Figure 1:
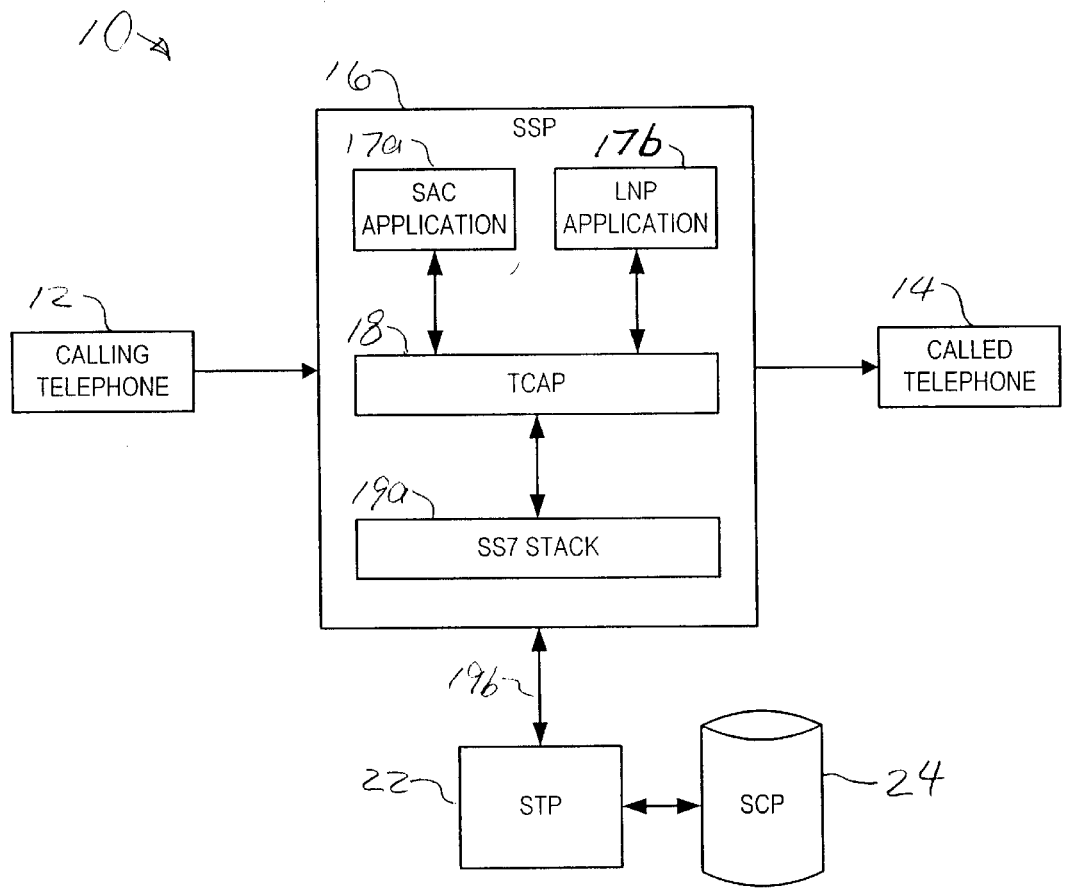
FIG. 1 is a schematic diagram of a system configured for redirecting calls in accordance with the prior art.

Referring to FIG. 1 of the drawings, the reference numeral 10 generally designates a switching system configured in accordance with the prior art. The system 10 includes a calling telephone 12 and a called telephone 14 interconnected via a switch service point (SSP) 16. The SSP 16 includes service access codes (SAC, e.g., 800 and 888 numbers) application 17a, and a local number portability (LNP) application 17b, for processing, respectively, SAC and LNP calls. The SSP 16, further includes a transaction capabilities application part (TCAP) function 18 effective for performing database queries for the SAC and LNP applications 17a and 17b. The TCAP function 18 is connected for routing queries, and for receiving responses, via a signaling system 7 (SS7) stack 19a, an SS7 network 19b, and any service transfer points (STP's) 22 in that network, to and from, respectively, a service control point (SCP) 24.

In operation, when a SAC call is made, the SSP 16 receives a SAC number from the calling telephone 12. The SAC application 17a within the SSP uses the TCAP function 18 to generate from the SAC number a query which is communicated via the SS7 stack 19a, the SS7network 19b, and the STP 22 to the SCP 24. The SCP 24 then translates the SAC number to a directory number (DN). The DN is returned in a response message from the SCP 24 via the STP 22, the SS7 network 19b, and the SS7 stack 19a, to the SAC application 17a. The SAC application 17a causes the SSP 16 to route the call to the DN, that is, to the called telephone 14, in a manner well-known in the art. Other configurations of SAC service exist in which a local exchange carrier (LEC, not shown) switch uses the SCP only to determine the interexchange carrier servicing the SAC number, and then to route the call to that carrier, which carrier in turn performs the SCP translation mentioned above.

Alternatively, if the LNP application 17b on the SSP 16 detects a number which may have been ported, in a manner well-known to the art, the LNP application 17b performs a query in a similar manner as described above for the SAC application 17a, except that the message encoded via TCAP may be different, and the query may be routed to a different SCP 24 than that used for SAC numbers. In that case, the SCP 24 returns a location routing number (LRN) if the called number has been ported, which the SSP 16 uses to route the call to the called telephone 14, in a manner well-known to the art.

The system 10 and the operation of the system 10 are considered to be well-known to those skilled in the art and will therefore not be described in further detail.

When a call is redirected (e.g., using the SAC or LNP applications 17a and 17b, respectively) in accordance with the prior art system 10 shown in FIG. 1, the SSP incurs about 30–40% more overhead on the call than it would with an ordinary (e.g., other than SAC or LNP) call. As a result, the SSP can process fewer calls, more calls may be blocked, and the revenue earned by the operator of the SSP may be reduced. This is due to the overhead incurred by the use of TCAP-based protocols and the SS7 stack and network, which require complex message encoding and other forms of overhead. Although this overhead may vary slightly from implementation to implementation, it is built into TCAP and SS7as a result of the design of these standards-based protocols.

Figure 2:
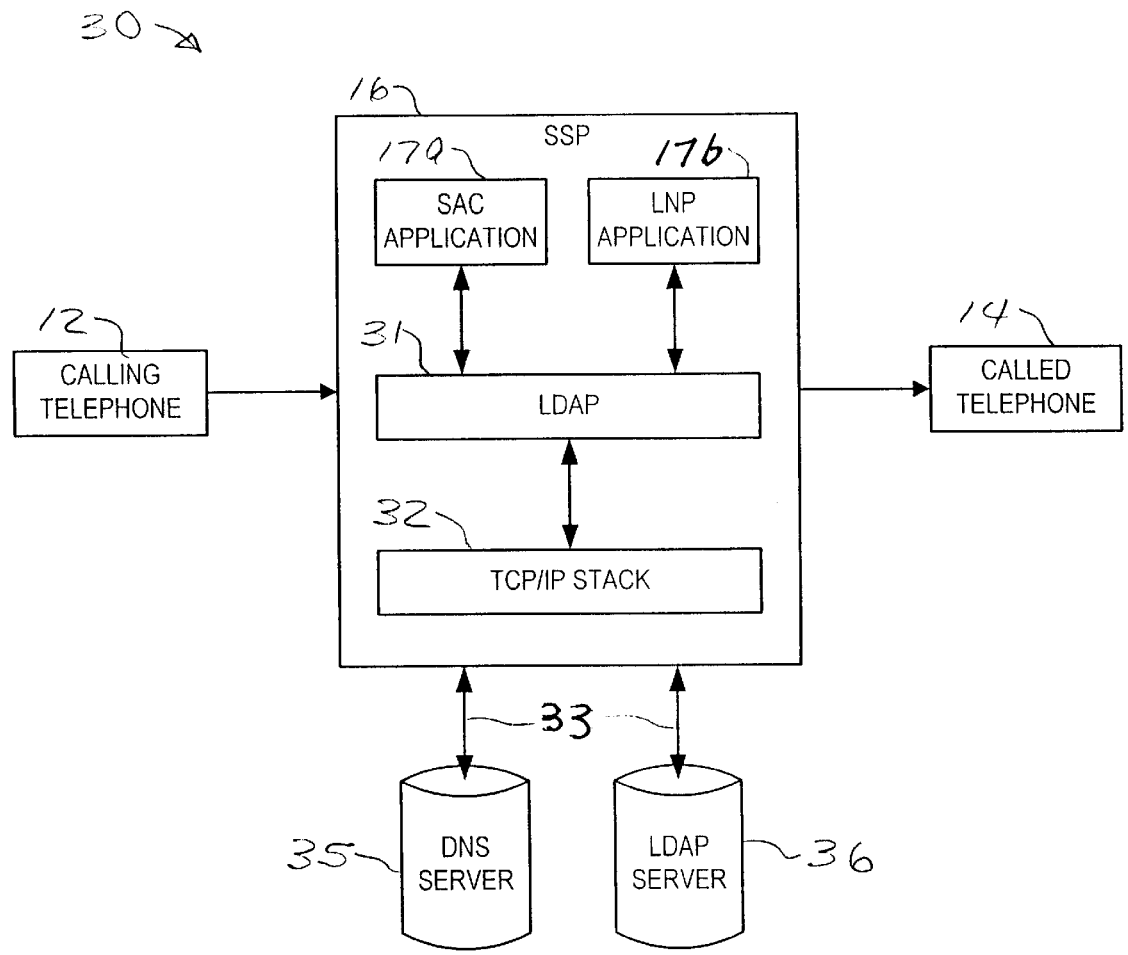
FIG. 2 is a schematic diagram of a system configured for redirecting calls in accordance with the present invention.

In FIG. 2, an embodiment of the present invention is shown which permits queries to be made with less overhead, which in turn allows calls to be redirected more efficiently than is possible with the prior art system 10 shown in FIG. 1. The embodiment shown in FIG. 2 is designated by the reference number 30, and comprises a modification of the system 10 in which the TCAP and SS7stacks 18 and 19a, respectively, are replaced by a lightweight directory access protocol (LDAP) 31 and a transmission control protocol/Internet protocol (TCP/IP) stack 32. The TCP/IP stack 32 is effective for communicating over an IP network 33, such as, for example, local area networking (LAN) and wide area networking (WAN) technologies such as Ethernet, frame relay, asynchronous transfer mode (ATM), and the like. A DNS server 35 may optionally be used in conjunction with the IP network 33 to facilitate addressing. The TCP/IP stack 32 and the DNS server 35 are considered to be well-known Internet protocols and not to warrant further discussion. The SAC and LNP applications 17a and 17b, respectively, use the LDAP function 31 to generate a query which is sent over the IP network to an LDAP server 36. The LDAP server 36 uses a standard internet protocol and is considered to be a well-known IP-based service, and is discussed in greater detail, for example, in *LDAP: Programming Directory-Enabled Applications with Lightweight Directory Access Protocol* by Timothy A. Howes and Mark C. Smith, published by MacMillan Technical Publishing, which is incorporated in its entirety herein by reference.

Figure 3:
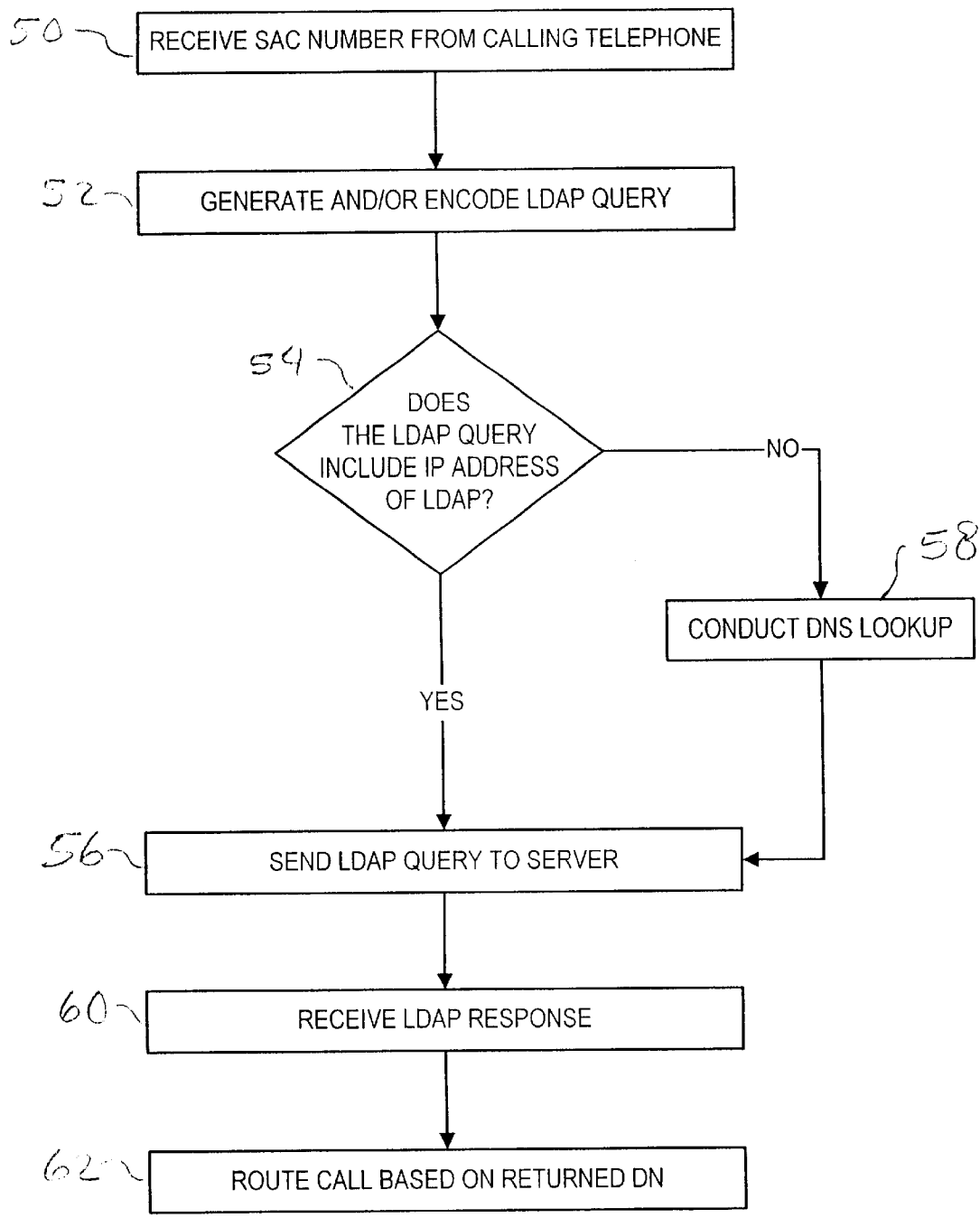
FIG. 3 is a flow chart illustrating control logic for implementing the system shown in FIG. 2.

FIG. 3 is a flow chart illustrating control logic for implementing the foregoing system shown in FIG. 2. As depicted in FIG. 3, in step 50, the SSP receives a SAC number from the calling telephone 12 and invokes the SAC application 17a. In step 52, the SAC application 17a uses the LDAP function 31 to generate an LDAP query to be sent to the LDAP server 36. In step 54, a determination is made whether the LDAP query includes an IP address of the LDAP server 36 to which the query will be sent. If, in step 54, it is determined that the LDAP query includes an IP address of the LDAP server 36, then execution proceeds to step 56; otherwise, if the query includes a domain name address, execution proceeds to step 58 in which the DNS server 35 is queried to resolve the IP address of the LDAP server 36.

In step 56, the LDAP query is transmitted via the LDAP function 31, the TCP/IP stack 32, and IP network 33 to the LDAP server 36. In step 60, a response, including a directory number (DN), is returned from the LDAP server 36 to the SAC application, again via the IP network 33, TCP/IP stack 32, and the LDAP function 31. In step 62, the SSP 16 then uses the information, including the DN, to route the call from the calling telephone 12 to the called telephone 14.

Alternatively, if an LNP number rather than a SAC number is entered from the calling telephone 12, then the LNP application 17b, rather than the SAC application 17a, is invoked. The LNP application 17b then uses the LDAP function 31 to generate an LDAP query to be sent to the LDAP server 36. Operation of the system 30 then continues as discussed above with respect to steps 54–62 depicted in FIG. 3, wherein the LNP application 17b is used in lieu of the SAC application 17a.

By the use of the foregoing system 30 shown in FIG. 3, SAC and LNP functions may be performed more efficiently due to the built-in efficiencies of the Internet protocols used, and the lower cost of equipment designed for IP-based networks as opposed to SS7 networks, particularly in the use of open, commercial technology.

It is understood that the present invention can take many forms and embodiments. Accordingly, several variations may be made in the foregoing without departing from the spirit or the scope of the invention. For example, the present invention may be configured for use with cellular telephones. To further exemplify, both the system 10 and the system 30 may be combined, e.g., used together in a system where both the system 10 of the prior art and the system 30 of the present invention are implemented and used side-by-side.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It is therefore contemplated that the claims will cover any such modifications or embodiments that fall within the true scope and spirit of the invention.

What is claimed is:

1. A method for redirecting a call, initiated by a called telephone number, utilizing a corrected destination address, comprising:
   a) encoding an LDAP query within a switch service point (SSP) with the called telephone number without employment of either a transaction capabilities application point (TCAP) stack or a service control point (SCP), wherein the called number is a service access code (SAC) or local number portability (LNP);
   b) transmitting the LDAP query via a TCP/IP stack to an LDAP server via an IP network;
   c) awaiting a response from the LDAP server to the TCP/IP stack, wherein the response includes the corrected destination address; and
   d) redirecting the call to the corrected destination address, wherein the corrected destination address is a directory number.

2. A method for redirecting a call, initiated by a called telephone number, utilizing a corrected destination address, comprising:
   a) encoding an LDAP query with the called telephone number within a switch service point (SSP) wherein the SSP coupled to the calling telephone employs Internet Protocol for call processing;
   b) transmitting the LDAP query via a TCP/IP stack to an LDAP server via an IP network, wherein at least a portion of the TCP/IP stack is positioned within a switch service point (SSP);
   c) awaiting a response from the LDAP server to the TCP/IP stack, wherein the response includes the corrected destination address; and
   d) redirecting the call to the corrected destination address.

3. The method of claim 1 wherein the IP network is a transport layer to transmit the LDAP query, the transport layer being selected from one of a local area network (LAN) transport layer or a wide area network (WAN) transport layer.

4. The method of claim 2 wherein the IP network is a local area network (LAN) transport layer to transmit the LDAP query, the LAN transport layer being an Ethernet transport layer.

5. The method of claim 2 wherein the IP network is a wide area network (WAN) transport layer to transmit the LDAP query, the WAN transport layer being selected from a group of transport layers including a frame relay transport layer and an asynchronous transfer mode (ATM) transport layer.

6. The method of claim 1 wherein the step of transmitting further comprises the step of resolving an IP address using a domain name service (DNS).

7. A system for redirecting a call, initiated by a called telephone number, to a corrected destination address, comprising:
   a) an encoder within a switch service point (SSP) configured for encoding a lightweight directory access protocol (LDAP) request with the called telephone number without employment of a transaction capabilities application point (TCAP) stack or a service control point (SCP), wherein the called number is a service access code (SAC) or corresponds to local number portability (LNP);

b) an Internet protocol (IP) network; and c) a lightweight directory access protocol (LDAP) server connected via the IP network to the encoder for receiving an LDAP query transmitted from the encoder, and for transmitting a response back to the encoder, wherein the response includes the corrected destination address, wherein the corrected destination address is a directory number.

8. A system for redirecting a call, initiated by a called telephone number, to a corrected destination address, comprising:

a) an encoder configured for encoding a lightweight directory access protocol (LDAP) request with the called telephone number, wherein at least a portion of the encoder is a TCP/IP stack positioned within a switch service point (SSP), wherein the SSP is configured to couple to a telephone generating the called telephone number;

b) an Internet protocol (IP) network; and c) a lightweight directory access protocol (LDAP) server connected via the IP network to the encoder for receiving an LDAP query transmitted from the encoder, wherein a response includes the corrected destination address.

9. The system of claim 7 wherein the IP network comprises a transport layer to transmit the LDAP query, the transport layer comprising one of a local area network (WAN) transport layer.

10. The system of claim 8 wherein the IP network comprises a local area network (LAN) transport layer to transmit the LDAP query, the LAN transport layer being an Ethernet transport layer.

11. The system of claim 8 wherein the IP network comprises a wide area network (WAN) transport layer to transmit the LDAP query, the WAN transport layer being selected from a group of transport layers including a frame relay transport layer and an asynchronous transfer mode (ATM) transfer layer.

12. The system of claim 7 wherein the called number is a service access code (SAC).

13. The system of claim 7 further comprising a domain name service (DNS) server connected to the IP network to resolve addresses.

14. A switch service point (SSP) for redirecting a call to a corrected destination address, comprising:

a) an application program configured for receiving service access codes (SAC);

b) a lightweight directory access protocol (LDAP) function connected to the application program for generating from the SAC a query using a lightweight directory access protocol (LDAP) without employment of a transaction capabilities application point (TCAP) stack or a service control point (SCP); and c) a transmission control protocol/Internet protocol (TCP/IP) stack interconnecting the LDAP function to an Internet protocol (IP) network for transmitting the query from the SSP to the IP.

15. The SSP of claim 14 wherein the application program is adapted to process service access code (SAC) calls.

16. The SSP of claim 14 wherein the application program is adapted to process local number portability (LNP) calls.

17. The SSP of claim 14 further comprising a domain name service (DNS) server connected to the IP network to resolve addresses.

* * * * *

UNITED STATES PATENT AND TRADEMARK OFFICE
CERTIFICATE OF CORRECTION

PATENT NO. : 6,778,544 B1 Page 1 of 1
DATED : August 17, 2004
INVENTOR(S) : Matthew R. Holiday It is certified that error appears in the above-identified patent and that said Letters Patent is hereby corrected as shown below:

Column 4,
Line 35, between "(SSP)" and "wherein" add a comma

Signed and Sealed this

Fourth Day of January, 2005

JON W. DUDAS
*Director of the United States Patent and Trademark Office*